(12) United States Patent
Grund

(10) Patent No.: US 8,232,514 B2
(45) Date of Patent: Jul. 31, 2012

(54) METHOD USING A SWITCH AND MEMORY TO COUNT EVENTS

(75) Inventor: Christian J. Grund, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 13/341,640

(22) Filed: Dec. 30, 2011

(65) Prior Publication Data

US 2012/0091324 A1    Apr. 19, 2012

Related U.S. Application Data

(63) Continuation of application No. 12/357,171, filed on Jan. 21, 2009, now Pat. No. 8,119,971.

(60) Provisional application No. 61/021,842, filed on Jan. 17, 2008.

(51) Int. Cl.
*H01J 40/14*    (2006.01)
(52) U.S. Cl. ............... 250/214 R; 250/214 SW
(58) Field of Classification Search ............ 250/214 R, 250/214 SW, 214.1, 208.1, 214 VT, 207; 371/21–38; 327/514; 313/528–533; 365/189.01, 365/201–210
See application file for complete search history.

(56) References Cited

U.S. PATENT DOCUMENTS

| | | | |
|---|---|---|---|
| 4,022,532 A | 5/1977 | Montagnino | |
| 4,201,468 A | 5/1980 | Margolis et al. | |
| 4,730,320 A | 3/1988 | Hidaka et al. | |
| 4,924,081 A * | 5/1990 | Arima et al. | ............. 250/214 R |
| 5,029,023 A | 7/1991 | Bearden et al. | |
| 5,091,778 A | 2/1992 | Keeler | |
| 5,192,978 A | 3/1993 | Keeler | |
| 5,317,376 A | 5/1994 | Amzajerdi et al. | |
| 5,345,304 A | 9/1994 | Allen | |
| 5,357,371 A | 10/1994 | Minott | |
| 5,485,009 A | 1/1996 | Meyzonnetie et al. | |
| 5,682,225 A | 10/1997 | DuBois et al. | |
| 5,682,229 A | 10/1997 | Wangler | |
| 5,784,023 A | 7/1998 | Bluege | |
| 5,793,034 A | 8/1998 | Wesolowicz et al. | |
| 5,815,250 A | 9/1998 | Thomson et al. | |

(Continued)

FOREIGN PATENT DOCUMENTS

GB    2300325    10/1996

(Continued)

OTHER PUBLICATIONS

International Search Report and Written Opinion for International Patent Application Serial No. PCT/US11/46689, mailed Mar. 20, 2012, 15 pages.

(Continued)

*Primary Examiner* — Que T Le
(74) *Attorney, Agent, or Firm* — Sheridan Ross P.C.

(57) ABSTRACT

A pulse data recorder system and method are provided. Upon the arrival or occurrence of an event or signal, the state of a digital switch is set. Upon receiving a pulse from a readout clock, the state of the switch is stored in a buffer memory, and the state of the switch is reset. As the readout clock is run, a time history of the state of the switch is obtained. The pulse data recorder can feature a plurality of unit cells, for use in imaging or other multiple pixel applications.

10 Claims, 7 Drawing Sheets

U.S. PATENT DOCUMENTS

| | | | |
|---|---|---|---|
| 5,847,816 A | 12/1998 | Zediker et al. |
| 5,870,180 A | 2/1999 | Wangler |
| 5,870,181 A | 2/1999 | Andressen |
| 5,914,776 A | 6/1999 | Streicher |
| 5,917,596 A | 6/1999 | Jenkins et al. |
| 5,923,466 A | 7/1999 | Krause et al. |
| 6,034,770 A | 3/2000 | Kim et al. |
| 6,173,066 B1 | 1/2001 | Peurach et al. |
| 6,323,941 B1 | 11/2001 | Evans et al. |
| 6,411,871 B1 | 6/2002 | Lin |
| 6,414,746 B1 | 7/2002 | Stettner et al. |
| 6,434,211 B1 | 8/2002 | Lloyd et al. |
| 6,448,572 B1 | 9/2002 | Tennant et al. |
| 6,542,831 B1 | 4/2003 | Moosmuller et al. |
| 6,608,669 B2 | 8/2003 | Holton et al. |
| 6,646,725 B1 | 11/2003 | Eichinger et al. |
| 6,657,733 B1 | 12/2003 | Drake |
| 6,664,529 B2 | 12/2003 | Pack et al. |
| 6,665,063 B2 | 12/2003 | Jamieson et al. |
| 6,747,258 B2 | 6/2004 | Benz et al. |
| 6,804,607 B1 | 10/2004 | Wood |
| 6,943,868 B2 | 9/2005 | Haig |
| 6,972,887 B2 | 12/2005 | Wickham et al. |
| 7,006,203 B1 | 2/2006 | Book et al. |
| 7,095,488 B2 | 8/2006 | Jamieson et al. |
| 7,113,886 B2 | 9/2006 | West |
| 7,142,981 B2 | 11/2006 | Hablani |
| 7,224,466 B2 | 5/2007 | Ray |
| 7,224,707 B2 | 5/2007 | Gendron |
| 7,236,235 B2 | 6/2007 | Dimsdale |
| 7,240,879 B1 | 7/2007 | Cepollina et al. |
| 7,277,641 B1 | 10/2007 | Gleckman |
| 7,342,228 B1 | 3/2008 | O'Connell et al. |
| 7,345,743 B1 | 3/2008 | Hartman et al. |
| 7,359,057 B2 | 4/2008 | Schwiesow |
| 7,397,568 B2 | 7/2008 | Bryce et al. |
| 7,406,220 B1 | 7/2008 | Christensen et al. |
| 7,436,494 B1 | 10/2008 | Kennedy et al. |
| 7,453,552 B1 | 11/2008 | Miesak |
| 7,580,132 B2 | 8/2009 | Baillon et al. |
| 2002/0117340 A1 | 8/2002 | Stettner |
| 2003/0063884 A1 | 4/2003 | Smith et al. |
| 2004/0021852 A1 | 2/2004 | DeFlumere |
| 2004/0119838 A1 | 6/2004 | Griffis et al. |
| 2004/0130702 A1 | 7/2004 | Jupp et al. |
| 2004/0213463 A1 | 10/2004 | Morrison |
| 2005/0060092 A1 | 3/2005 | Hablani |
| 2005/0099634 A1 | 5/2005 | Dubois et al. |
| 2006/0088946 A1 | 4/2006 | Willson et al. |
| 2006/0114447 A1 | 6/2006 | Harris et al. |
| 2006/0132752 A1 | 6/2006 | Kane |
| 2006/0136172 A1 | 6/2006 | O'Kane et al. |
| 2006/0197936 A1 | 9/2006 | Liebman et al. |
| 2007/0073486 A1 | 3/2007 | Tillotson et al. |
| 2007/0110364 A1 | 5/2007 | Rice et al. |
| 2007/0115541 A1 | 5/2007 | Rogers et al. |
| 2007/0122001 A1 | 5/2007 | Wang et al. |
| 2007/0171407 A1 | 7/2007 | Cole et al. |
| 2007/0263676 A1 | 11/2007 | Beukema et al. |
| 2008/0023587 A1 | 1/2008 | Head et al. |
| 2008/0136626 A1 | 6/2008 | Hudson et al. |
| 2008/0212328 A1 | 9/2008 | Minano et al. |
| 2008/0273560 A1 | 11/2008 | Stelmakh |
| 2008/0290259 A1 | 11/2008 | Mathewson et al. |
| 2008/0316498 A1 | 12/2008 | Drake et al. |
| 2009/0002680 A1 | 1/2009 | Ruff et al. |
| 2009/0046289 A1 | 2/2009 | Caldwell et al. |
| 2009/0059201 A1 | 3/2009 | Willner et al. |
| 2009/0110267 A1 | 4/2009 | Zakhor et al. |
| 2009/0115994 A1 | 5/2009 | Stettner et al. |
| 2009/0142066 A1 | 6/2009 | Leclair et al. |
| 2009/0237640 A1 | 9/2009 | Krikorian et al. |
| 2009/0273770 A1 | 11/2009 | Bauhahn et al. |
| 2009/0310118 A1 | 12/2009 | Halldorsson |
| 2010/0165323 A1 | 7/2010 | Fiess et al. |

FOREIGN PATENT DOCUMENTS

| | | |
|---|---|---|
| GB | 2306828 | 5/1997 |
| GB | 2364840 | 2/2002 |
| WO | WO 02/04982 | 1/2002 |
| WO | WO 02/065155 | 8/2002 |
| WO | WO 2007/081628 | 7/2007 |
| WO | WO 2009/133414 | 11/2009 |

OTHER PUBLICATIONS

International Preliminary Report on Patentability for International Patent Application Serial No. PCT/US2010/021213, mailed Aug. 4, 2011, 7 pages.

Brian F. Aull et al., "Geiger-Mode Avalanche Photodiodes for Three-Dimensional Imaging", Lincoln Laboratory Journal, vol. 13, No. 2 (2002).

Didier Bruneau, "Mach-Zehnder Interferometer as a Spectral Analyzer for Molecular Doppler Wind Lidar", Applied Optics, vol. 40, No. 3, pp. 391-399 (2001).

Didier Bruneau and Jacques Pelon, "Simulation and Measurement of Particle Backscattering & Extinction Coefficient & Wind Velocity by Lidar with a Mach-Zehnder Interferometer: Principle of Operation & Performance Assessment", Applied Optics, vol. 42, No. 6, pp. 1101-1114 (2003).

Pierre Connes and Guy Michel, "Astronomical Fourier Spectrometer", Applied Optics, vol. 14, No. 9, pp. 2067-2084 (1975).

Degnan, John J., "Photon-Counting Multikilohertz Microlaser Altimeters for Airborne and Spaceborne Topographic Measurements", Journal of Geodynamics, vol. 34, pp. 503-549 (2002).

T.S. Durrani and C.A. Greated, "Spectral Analysis and Cross-Correlation Techniques for Photon Counting Measurements on Fluid Flows", Applied Optics, vol. 14, No. 3, pp. 778-794 (1975).

W.A. Gault, et al., "ERWIN: An E-Region Wind Interferometer", Applied Optics, vol. 35, No. 16, pp. 2913-2922 (1996).

Gentry, Bruce et al., "The Tropospheric Wind Lidar Technology Experiment (TWiLiTE): An Airborne Direct Detection Doppler Lidar Instrument Development Program", available at http://esto.nasa.gov/conferences/estc2006/papers/b8p2.pdf.

Pierre Jacquinot, *"The Luminosity of Spectrometers with Prisms, Gratings, or Fabry-Perot Etalons"*, Journal of the Optical Society of America, vol. 44, No. 10, pp. 761-765 (1954).

V. Nirmal Kumar and D. Narayana Rao, *"Determination of the Instrument Function of a Grating Spectrometer by Using White-Light Interferometry"*, Applied Optics, vol. 36, No. 19, pp. 4535-4539 (1997).

Lieber, Mike et al., "Development of a Validated End-to-End Model for Space-Based Lidar Systems", *Lidar Remote Sensing for Environmental Monitoring VIII* (Singh, Upendra N. ed.), Proceedings of the SPIE, vol. 6681, 66810F (2007).

Lieber, Mike et al., "System Verification of the JMEX Mission Residual Motion Requirements with Integrated Modeling", *UV/Optical/IR Space Telescopes: Innovative Technologies and Concepts II* (MacEwen, Howard A. ed.), Proceedings of the SPIE, vol. 5899, 589901, pp. 1-12 (2005).

Lieber, Mike et al., "Integrated System Modeling for Evaluating the Coronagraph Approach to Plant Detection", *High-Contrast Imaging for Exo-Planet Detection* (Schultz, Alfred B. ed.), Proceedings of the SPIE, vol. 4860 (2002). (Abstract only).

W.T. Mayo, Jr., "Photon Counting Processor for Laser Velocimetry", Applied Optics, vol. 16, No. 5, pp. 1157-1162 (1977).

G.A. Morton, "Photon Counting", Applied Optics, vol. 7, No. 1, pp. 1-10 (1968).

Rabinovich, W.S. et al., "45 Mbps Cat's Eye Modulating Retro-Reflector Link Over 7 Km", *Free-Space Laser Communications VI*, Proceedings of the SPIE, vol. 6304, pp. 63040Q (2006). (Abstract only).

Robert L. Richardson and Peter R. Griffiths, "Design and Performance Considerations of Cat's Eye Retroreflectors for Use in Open-Path Fourier-Transform-Infrared Spectrometry", Applied Optics, vol. 41, No. 30, pp. 6332-6340 (2002).

J. Ring and J.W. Schofield, "Field-Compensated Michelson Spectrometers", Applied Optics, vol. 11, No. 3, pp. 507-516 (1972).

Gordon G. Shepherd et al., "WAMDII: Wide-Angle Michelson Doppler Imaging Interferometer for Spacelab", Applied Optics, vol. 24, No. 11, pp. 1571-1584 (1985).

Gordon G. Shepherd et al., "WINDII—The Wind Imaging Interferometer for the Upper Atmosphere Research Satellite", Geophys. Res. vol. 98, No. D6, pp. 10,725-10,750 (1993).

Vallerga, John et al., "Noiseless, High Frame Rate (>KHz), Photon Counting Arrays for Use in the Optical to the Extreme UV", University of California, Berkeley—Sciences Laboratory and University of Geneva, Switzerland, available at http://www.ssl.berkeley.edu/~mcphate/AO/ao_medipix.html (2004-present).

Shiquang Wang, Gordon G. Sheperd, and William E. Ward, "Optimized Reflective Wide-Angle Michelson Phase-Stepping Interferometer", Applied Optics, vol. 39, No. 28, pp. 5147-5160, (2000).

Grund, et al. "Enabling Characteristics of Optical Autocovariance Lidar for Global Wind and Aerosol Profiling", AGU, American Geophysical Union, Fall Meeting, San Francisco, CA (Dec. 16, 2008).

Grund, Chris, "An Alternative Direct Detection Approach to Doppler Winds that is Independent of Aerosol Mixing Ratio and Transmitter Frequency Jitter", Space Winds Lidar Working Group, Miami, FL (Feb. 8, 2007).

Grund, Christian et al., "Optical Autocovariance Wind Lidar and Performance from LEO", 14th Coherent Laser Radar Conference, Snowmass, CO (Jul. 7, 2007).

Grund, Christian et al., "Supporting NOAA and NASA High-Performance Space-Based DWL Measurement Objectives with a Minimum Cost, Mass, Power, and Risk Approach Employing Optical Autocovariance Wind Lidar (OAWL)", Space Winds Lidar Working Group, Monterrey, CA (Feb. 6, 2008).

Grund, Christian, et al., Presentation Entitled "Simultaneous Profiling of Aerosol Optical Properties, Gas Chemistry, and Winds with Optical Autocovariance Lidar", 24th ILRC Conference (Jun. 23, 2008).

Chris Grund, "Lidar Wind Profiling from Geostationary Orbit Using Imaging Optical Autocovariance Interferometry", Space Winds Lidar Working Group, Snowmass, CO (Jul. 17, 2007).

Grund, et al., Poster and Paper Entitled "Optical Autocovariance Wind Lidar (OAWL) for Efficient Space-Based Direct-Detection High-Resolution Aerosol Backscatter Winds", International Laser Radar Conference, Boulder, CO (Jun. 24, 2008).

Grund et al., Poster Entitled "Optical Autocovariance Wind Lidar (OAWL) for Efficient Space-Based Direct-Detection High-Resolution Aerosol Backscatter Winds", presented at the Coherent Laser Radar Conference, Jul. 2007, presented at the Working Group on Space-based Lidar Winds, Feb. 2008, and presented at the International Laser Radar Conference, Boulder, CO, Jun. 23-27, 2008, 1 page.

Grund, Christian J., Power Point Presentation Entitled "Optical Autocovariance: Alternative Direct Detection Approach to Doppler Winds that is Independent of Aerosol Mixing Ratio and Transmitter Frequency Jitter", presented at the Working Group Conference on Space-Based Lidar Winds, Feb. 6-9, 2007, 12 pages.

Grund et al., Presentation Entitled "Optical Autocovariance Wind Lidar and Performance from Leo", presented at the Coherent Laser Radar Conference, Jul. 11, 2007, 30 pages.

Grund et al. "Simultaneous Profiling of Aerosol Optical Properties, Gas Chemistry, and Winds with Optical Autocovariance Lidar", Paper 1 of 2 presented at the 24th International Laser Radar Conference, Jun. 23-27, 2008, 5 pages.

Grund et al., "Optical Autocovariance Wind Lidar (OAWL) for Efficient Space-Based Direct-Detection High-Resolution Aerosol Backscatter Winds", Paper 2 of 2 presented at the 24th International Laser Radar Conference, Jun. 23-27, 2008, 5 pages.

Kasten, et al., "Fabrication and Characterization of Individually Addressable Vertical-Cavity Surface-Emitting Laser Arrays and Integrated VCSEL/PIN Detector Arrays", Proceedings of SPIE, vol. 6484, 64840C, 2007.

Aerius Photonics website, "Aerius NIR/SWIR Illuminators" product sheet, available at http://www.aeriusphotonics.com/datasheets.html, 2 pages (2009).

International Search Report and Written Opinion for International Patent Application Serial No. PCT/US2010/033559, mailed Jul. 6, 2010, 9 pages.

Allen et al., "Full-Scale Testing and Platform Stabilization of a Scanning Lidar System for Planetary Landing", *Space Exploration Technologies* (Wolfgang Fink, ed.), Proceedings of SPIE, vol. 6960, pp. 696004-1-696004-10 (2008).

Bakalski et al., "Real Time Processing Enables Fast 3D Imaging at Single Photon Level", *Laser Radar Technology and Applications XIII*, (Monte D. Turner, Gary W. Kamerman, ed.), Proceedings of the SPIE, vol. 6950, pp. 69500K-1-69500K-9 (2008).

Baker et al., "Advanced Infrared Detectors for Multimode Active and Passive Imaging Applications" *Infrared Technologies and Applications XXXIV* (Bjorn F. Andresen, Gabor F. Fulop, and Paul R. Norton, ed.), Proceedings of the SPIE, vol. 6940, pp. 69402L-1-69402L-11 (2008).

Brady and Schwartz, "ALHAT System Architecture and Operational Concept", Aerospace Conference, 2007 IEEE, Big Sky, MT, IEEEAC Paper # 1570, Version 4, pp. 1-13 (2007).

Cho et al., "Real-Time 3D Ladar Imaging", 35th Applied Imagery and Patern Recognition Workshop, pp. 5 (2006).

Craig et al., "Processing 3D Flash LADAR Point-Clouds in Real-Time for Flight Applications", *Sensors and Systems for Space Applications* (Richard T. Howard and Robert D. Richards, ed.), Proceedings of SPIE, vol. 6555, pp. 65550D-1-65550D-9 (2007).

Dissly et al., "Flash LIDAR Systems for Planetary Exploration", American Astronomical Society, DPS Meeting, Presentation # 40, Ithaca, NY, Bulletin of the American Astronoimical Society, vol. 41, pp. 560 (2008).

Fay et al., "Fusion of Multi-Sensor Pasive and Active 3D Imagery", *Enhanced and Synthetic Vision 2001* (Jacques G. Verly, ed.), Proceedings of SPIE, vol. 4363, pp. 219-230 (2001).

Gillula, "Data Fusion From Multiple Sensors: Real-Time Mapping on an Unmanned Ground Vehicle", 2005 SURF Final Report, California Institute of Technology, 13 pgs (2005).

Habbit et al., "Utilization of Flash LADAR for Cooperative and Uncooperative Rendezvous and Capture", Space Systems Technology and Operations (Peter Tchoryk, Jr. and James Shoemaker, ed.), Proceedings of SPIE, vol. 5088, pp. 146-157 (2003).

Hyde et al., "Mapping Forest Structure for Wildlife Habitat Analysis Using Multi-Sensor (LiDAR, SAR/InSAR, ETM+, Quickbird) Synergy", Remote Sensing of Environment, vol. 102, pp. 63-73 (2006).

De Lafontaine et al., "LAPS: The Development of a Scanning Lidar System with GNC for Autonomous Hazard Avoidance and Precision Landing"; *Spaceborne Sensors* (Robert D. Habbit, Jr. and Peter Tchoryk, Jr., ed.), Proceedings of SPIE, vol. 5418, pp. 81-93 (2004).

Lamoreux et al., "Relative Navigation Sensor for Autonomous Rendezvous and Docking", *Laser Radar Technology and Applications VIII* (Gary W. Kamerman, ed.), Proceedings of the SPIE, vol. 5086, pp. 317-328 (2003).

Lefsky et al., "Estimates of Forest Canopy Height and Aboveground Biomass Using ICESat", Geophysical Research Letters, vol. 32, L2202, 4 pages (2005).

Marino and Davis, Jr., "Jigsaw: A Foliage-Penetrating 3D Imaging Laser Radar System"; Lincoln Laboratory Journal, vol. 15, No. 1, pp. 23-36 (2005).

Oberle and Davis, "Toward High Resolution, Ladar-Quality 3-D World Models Using Ladar-Stereo Data Integration and Fusion," Army Research Laboratory, ARL-TR-3407, 37 pgs (2005).

Pack et al., "A Co-Boresighted Synchronized Ladar/EO Imager for Creating 3D Images of Dynamic Scences", *Laser Radar Technology and Applications, X* (Gary W. Kamerman, ed.), Proceedings of SPIE, vol. 5791, pp. 42-50 (2005).

Pierrottet et al., "Characterization of 3-D Imaging Lidar for Hazard Avoidance and Autonomous Landing on the Moon"; *Laser Radar Technology and Applications XII* (Monte D. Turner and Gary W. Kamerman, ed.), Proceedings of SPIE, vol. 6550, pp. 655008-1-655008-9 (2007).

Riris et al., "The Lunar Orbiter Laser Altimeter (LOLA) on NASA's Lunar Reconnaissance Orbirot (LRO) Mission", *Sensors and Systems for Space Applications* (Richard T. Howard and Robert D. Richards, ed.), Proceedings of SPIE, vol. 6555, pp. 655501-1-655501-8 (2007).

Roberts, Jr. and LeVan, "Aperture Sharing Between Low-Background Infrared Sensors and Ladar Sensors", Aerospace Applications Conference, Proceedings of the IEEE, vol. 4, pp. 495-508 (1996).

Smith et al., "Diffractive Optics for Moon Topography Mapping"; *Micro (MEMS) and Nanotechnologies for Space Applications* (Thomas George and Zhong-Yang Cheng, ed.), Proceedings of SPIE, vol. 6223, pp. 622304-1-622304-10 (2006).

Stentz et al., "Real-Time, Multi-Perspective Perception for Unmanned Ground Vehicles", Proceedings of the Association for Unmanned Vehicle Systems International, 15 pgs (2003).

Stettner et al., "Three Dimensional Flash Ladar Focal Planes and Time Dependent Imaging" Advanced Scientific Concepts, Inc., 5 pgs (Undated).

Tan and Narayanan, "Design and Performance of a Multiwavelength Airborne Polarimetric Lidar for Vegetation Remote Sensing"; Journal of Applied Optics, vol. 43, No. 11, pp. 2360-2368 (2004).

Trenkle et al., "3D Sensor Algorithms for Spacecraft Pose Determination", *Spaceborne Sensors III* (Richard T Howard and Robert D. Richards, ed.), Proceedings of SPIE, vol. 6220, pp. 62200D-1-62200D-14 (2006).

Weinberg et al., "Flash Lidar Systems for Hazard Detection, Surface Navigation and Autonomous Rendezvous and Docking", 2007 LEAG Workshop on Enabling Exploration, 2 pgs (2007).

Yoon et al., "High Frequency Attitude Motion of ICESat", *Advances in Astronautical Sciences* (David A. Vollado, Michael J. Gabor and Prasun N. Desai ed.), vol. 120: Spaceflight Mechanics, Part 1, pp. 117-131 (2005).

Robert C. Fenton, "A LADAR-Based Pose Estimation Algorithm for Determining Relative Motion of a Spacecraft for Autonomous Rendezvous and Dock", Master of Science thesis, Utah State University, 90 pages (2008).

Chen et al., "RANSAC-Based DARCES: A New Approach to Fast Automatic Registration of Partially Overlapping Range Images", IEEE Transactions on Pattern Analysis and Machine Intelligence, vol. 21, No. 11, 6 pages (Nov. 1999).

Vasile et al., "Pose-Independent Automatic Target Detection and Recognition Using 3D Laser Radar Imagery", Lincoln Laboratory Journal, vol. 15, No. 1, 18 pages (2005).

Ruel et al., "Field Testing of a 3D Automatic Target Recognition and Pose Estimation Algorithm", Automatic Target Recognition XIV, SPIE vol. 5426, 10 pages (2004).

Allen et al., "Rendezvous Lidar Sensor System for Terminal Rendezvous, Capture, and Berthing to the International Space Station", Sensors and Systems for Space Applications II, SPIE vol. 6958, 8 pages (2008).

Jasiobedzki et al., "Autonomous Satellite Rendezvous and Docking Using LIDAR and Model Based Vision", Spaceborne Sensors II, SPIE vol. 5798, 12 pages (2005).

Fenton et al., "Simulation Tests of a Lidar-based Spacecraft Pose Determination Algorithm", Sensors and Systems for Space Applications, SPIE vol. 6555, 11 pages (2007).

Ruel et al., "Real-Time 3D Vision Solution for On-Orbit Autonomous Rendezvous & Docking", Spaceborne Sensors III, SPIE 6220, 11 pages (2006).

Wikipedia, "RANSAC", available at http://en.wikipedia.org/wiki/RANSAC, 5 pages (2009).

Xun et al., "Expanding range of pulsed range sensors with active projection from spatial light modulators", Spaceborne Sensors III, Proc. of SPIE vol. 6220, 62200I, 2006, 9 pages Earhart et al., U.S. Appl. No. 12/464,009, filed May 11, 2009.

Official Action for U.S. Appl. No. 12/464,009, mailed Aug. 4, 2010, 25 pages.

Notice of Allowance for U.S. Appl. No. 12/464,009, mailed Jan. 31, 2011, 10 pages.

International Search Report and Written Opinion for International Application No. PCT/US2010/033559, mailed Jul. 6, 2010, 9 pages.

International Preliminary Report on Patentability for International Application No. PCT/US2010/033559, mailed Nov. 24, 2011, 8 pages.

Earhart et al., U.S. Appl. No. 13/099,118, filed May 2, 2011.

Grund et al., U.S. Appl. No. 12/357,251, filed Jan. 21, 2009.

Official Action for U.S. Appl. No. 12/357,251, mailed Mar. 11, 2011, 23 pages.

Notice of Allowance and Fee(s) Due for U.S. Appl. No. 12/357,251, mailed Sep. 13, 2011, 11 pages.

Grund et al., U.S. Appl. No. 12/390,226, filed Feb. 20, 2009.

Restriction Requirement for U.S. Appl. No. 12/390,226, mailed Aug. 31, 2010, 6 pages.

Notice of Allowance and Fee(s) Due for U.S. Appl. No. 12/390,226, mailed Dec. 17, 2010, 23 pages.

Grund et al., U.S. Appl. No. 13/043,279, filed Mar. 8, 2011.

Grund, Christian J., U.S. Appl. No. 12/357,171, filed Jan. 21, 2009.

Restriction Requirement for U.S. Appl. No. 12/357,171, mailed Sep. 19, 2011, 6 pages.

Notice of Allowance and Fee(s) Due for U.S. Appl. No. 12/357,171, mailed Dec. 6, 2011, 32 pages.

International Search Report and Written Opinion for International Patent Application Serial No. PCT/US2010/021213, mailed Mar. 22, 2010, 8 pages.

Weimer et al., U.S. Appl. No. 12/857,354, filed Aug. 16, 2010.

Gravseth et al., U.S. Appl. No. 12/647,883, Entitled "Method and Apparatus for Lidar Target Identification and Pose Estimation", filed Dec. 28, 2009, 35 pages.

\* cited by examiner

METHOD USING A SWITCH AND MEMORY TO COUNT EVENTS

CROSS REFERENCE TO RELATED APPLICATIONS

This application is a continuation of U.S. patent application Ser. No. 12/357,171, filed Jan. 21, 2009, which claims the benefit of U.S. Provisional Patent Application Ser. No. 61/021,842, filed Jan. 17, 2008, the entire disclosures of which are hereby incorporated herein by reference.

FIELD

The disclosed invention is directed to a pulse data recorder. More particularly, the state of a switch is set in response to the occurrence of an event, and that state is recorded in a first-in first-out buffer at a number of time intervals within some period of time.

BACKGROUND

Devices for photon counting have been proposed and demonstrated for use in connection with various applications. For example, lidar systems, in which light is used to determine the range to and/or characteristics of a target require that photons arriving from the target area be detected, time-stamped, and counted. In general, photon counting devices have included amplifier mechanisms, by which the receipt of a single photon or small number of photons results in the production of a relatively large number of electrons, which can then be passed to processing or detector circuitry. Examples of such amplification devices include avalanche photo diodes (APDs), Geiger-mode APDs, dynodes, and micro channel plates (MCPs) with and without photocathodes. The electrons produced as a result of receiving photons are passed to circuitry to characterize the intensity and/or time of arrival of the photons.

Light detection and ranging (LIDAR) systems have been developed that are capable of remotely measuring winds in connection with weather forecasting and climate studies. In general lidar operates by transmitting light from a laser source to a volume of interest and detecting the time of flight for the backscattered light to determine range to the scattering volume. A Doppler wind lidar additionally measures the Doppler shift experienced by photons scattered back to the instrument due to the motion of molecules and aerosols (e.g. particles and droplets) in the scattering volumes. The speed of the wind is determined from the Line of Sight (LOS) speed of the molecules and aerosols relative to the lidar. However, the range of such systems has been limited, because of the small number of photons that are returned to a detector when ranges are large. As a result, lidar systems are often placed in Low Earth Orbit (LEO) to be relatively close to the surface and therefore travel at a significant speed relative to the surface of the Earth, limiting their ability to economically collect data with the spatial and temporal coverage needed for many environmental and defense applications.

An example of a photon counting system that utilizes an APD, and specifically a Geiger-mode APD, is an imaging ladar (laser detection and ranging) system developed by Lincoln Laboratory. In this system, on the order of $10^7$ electron-hole pairs are produced when a photon is detected. Electrons resulting from the detection event are passed to a latch that causes the output of a counter to be frozen upon detection of a photon. The state of the counter after being frozen encodes the number of clock cycles that have elapsed from the start of counting to the time at which the photon was detected. Accordingly, when used in a lidar application, a time of flight (and thus a range) can be determined. However, because the counter is stopped once a photon is detected, later arriving photons are not counted, and therefore the associated lidar is only useful in connection with the sensing of hard targets. In addition, the system does not provide intensity information on a single flash. Intensity information is only obtained from summing over multiple returns, leading to operating inefficiencies. As another limitation, the Geiger-mode APD requires significant time to quench conduction and recharge bias after a triggering event. In addition, such systems can suffer from high dark noise levels.

Other time-resolved light measurement systems that also utilize APDs provide an analog sample and hold circuit that stores about 5-40 samples. Accordingly, the individual samples are collected over some increment in time, which is dependent on the speed at which a commutator used to distribute returned signals to the elements of the sample and hold circuit is run. As a result, an analog waveform of a return signal can be obtained. The number of samples within the waveform is limited to about 40, because of the size of the analog cells compared to the limited pixel area available for unit cell circuitry in imaging arrays, the need for high bandwidth to achieve high temporal resolution, and the power necessarily dissipated by high bandwidth analog circuits. In addition, such systems are useful only for hard targets, because the noise generated in the high bandwidth analog capture and measurement process must be overcome by the higher return signal power generally available from hard target returns.

Photon counting detector arrays have also been proposed for use in medical imaging applications. According to such systems, detected photons are counted over some period of time. However, no record of the time at which individual counts accumulated within that time period occur is maintained. Accordingly, such systems have application in medical or other imaging applications, but are not capable of providing range information.

SUMMARY

In accordance with embodiments of the present invention, a pulse data recorder that provides an all digital readout circuit and that is capable of high speed operation is provided. In particular, a received signal sets the state of a digital switch. The state of the digital switch is stored in a first-in first-out buffer, such as a one bit wide memory or shift register, at times corresponding to each pulse of a clock, to record a sequence of output states for the digital switch. The resulting time record of the state of the digital switch in the buffer or memory can then be read out and formatted.

In accordance with embodiments of the present invention, the signal that is used to toggle or set the state of the digital switch may comprise an electron pulse generated in response to the receipt of one or more photons arriving at a location or area associated with the digital switch. By providing a plurality of such locations, each associated with a digital switch and memory, an array can be provided. Accordingly, embodiments of the present invention may be used in imaging applications.

The record of the state of the digital switch for each unit cell of a high speed pulse data recorder in accordance with embodiments of the present invention comprises a record of the time of detected photon arrivals. Moreover, this allows intensity determinations to be made from the time difference in arrival between any two photons, in turn allowing ultra high time resolution intensity measurement. Also, embodiments of the present invention preserve the digital nature of the photon signal, as there is no digital to analog or analog to digital conversion involved, or noise inducing high bandwidth analog circuits. In addition to allowing very high frame rates, certain digital noise reduction procedures can be applied in line before signal averaging or summing. Moreover, a strictly digital readout integrated circuit design is enabled that allows maximum use of high speed, low power, dense, digital integrated circuit technologies.

Additional features and advantages of embodiments of the present invention will become more readily apparent from the following detailed description, particularly when taken together with the accompanying drawings.

DETAILED DESCRIPTION

Figure 1:
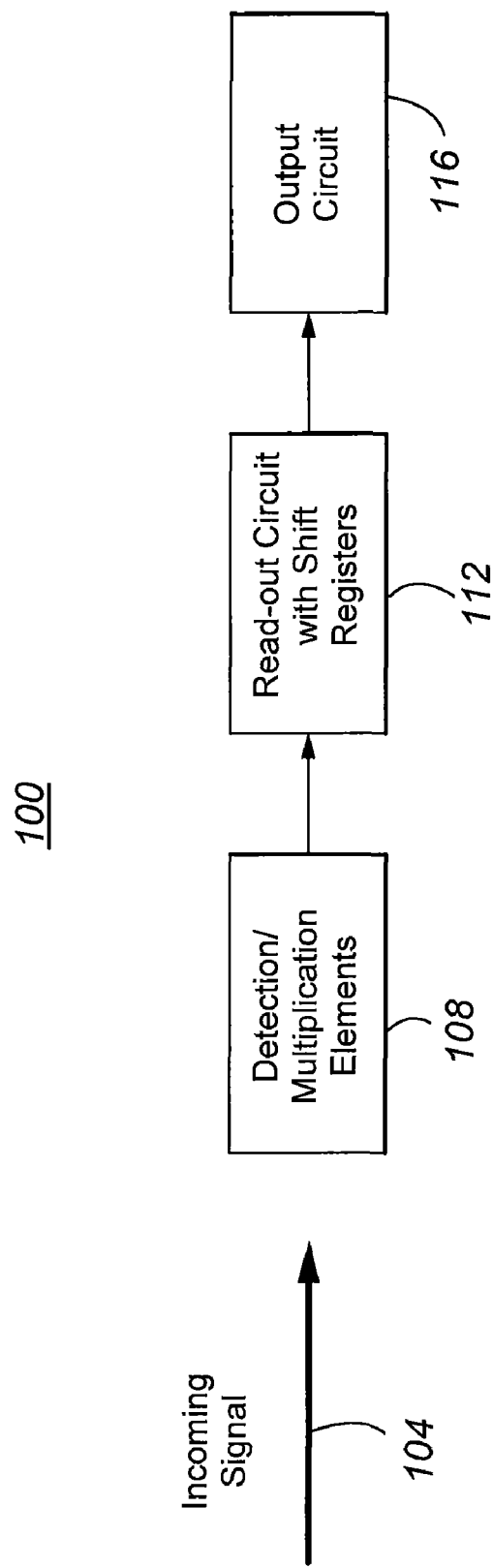
FIG. 1 is a high level block diagram of a pulse data recorder in accordance with embodiments of the present invention.

FIG. 1 presents a high level diagram of a pulse data recorder 100 in accordance with embodiments of the present invention. In general, an incoming signal 104 is received at one or more detection/multiplication elements 108. The incoming signal 104 may comprise any perceptible signal, such as an optical signal comprising one or more photons, an electrical signal comprising one or more electrons or a voltage potential, a movement, or a magnetic or other force. The detection/multiplication elements 108 detect the incoming signal 104, and transform and/or multiply the incoming signal into an electrical signal sufficient to toggle the state of a digital switch. A readout circuit with shift registers or memory 112 generally provides the digital switch or switches that are provided with the transformed and/or amplified signal from the detection/multiplication elements. A first-in first-out buffer, such as a shift register or one bit wide memory, referred to hereafter as buffer memory, is associated with each digital switch. The memory records the state of the associated digital switch at different moments in time. In general, a detection/multiplication element and the digital switch and buffer memory associated with that detection/multiplication element comprise components of a unit cell of the pulse data recorder. An output circuit 116 reads out the information stored in the memory, for output and/or analysis. As will be described in greater detail elsewhere herein, the output circuit 116 may also operate to provide data compression and different views of the data from the buffer memory, including the rate at which detected events occur, the intensity of detected events, and noise cancellation functions.

Figure 2:
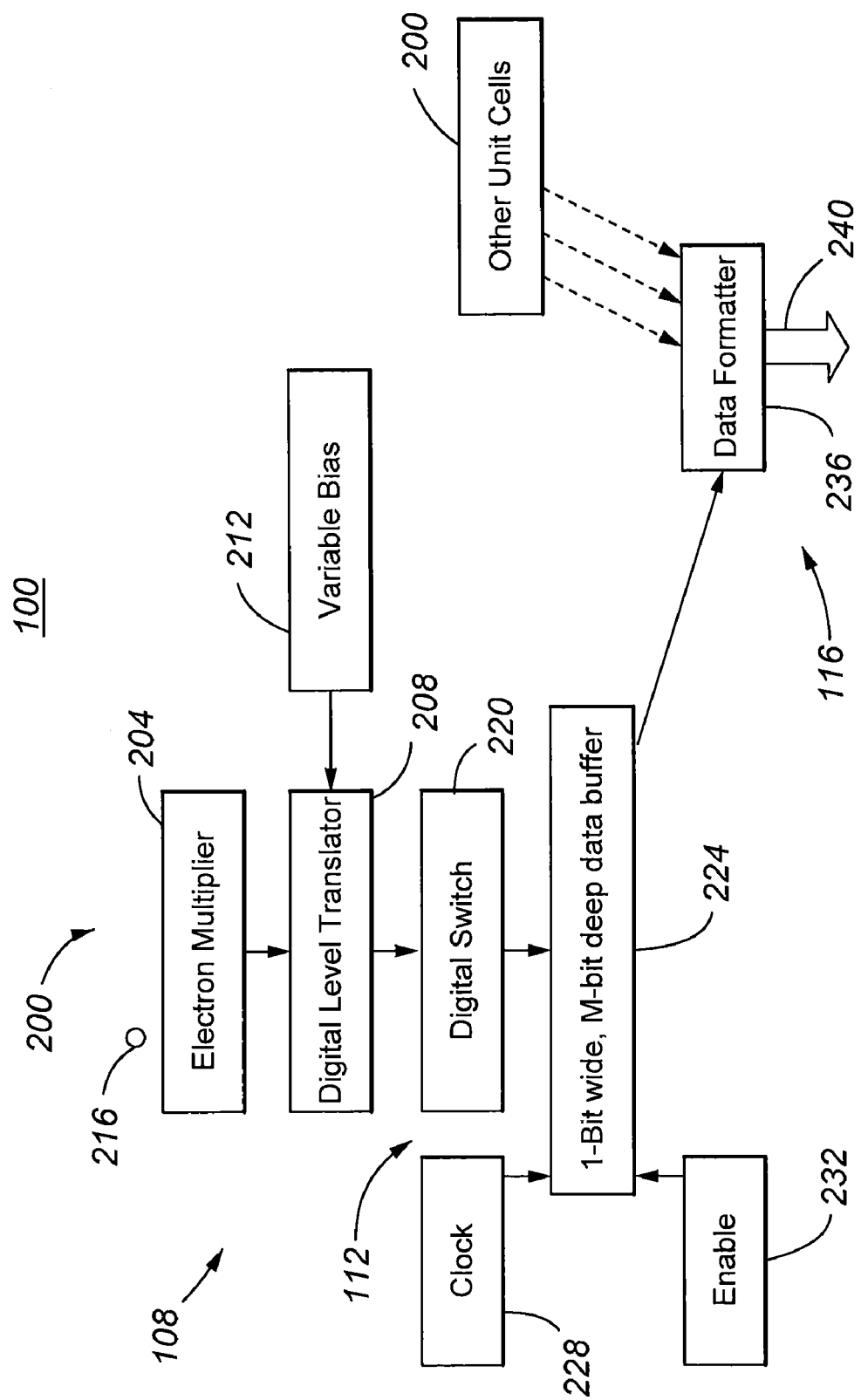
FIG. 2 depicts components of a pulse data recorder in accordance with embodiments of the present invention.

FIG. 2 depicts components that may be included in a unit cell 200 of a pulse data recorder 100 in accordance with embodiments of the present invention. The detection/multiplication elements 108 generally comprise an electron multiplier 204, a digital level translator 208 and an associated variable bias 212. In operation, the electron multiplier 204 receives an electron 216 emitted from an electron source. Examples of electron sources include, but are not limited to, a photocathode, a radiation target, and an illuminated semiconductor layer. Examples of an electron multiplier 204 include, but are not limited to, a microchannel plate (MCP), and a Geiger-mode device such as a semiconductor or rarified gas electrical discharge channel. The output from the electron multiplier 204 is provided to the digital level translator 208. More particularly, the electron multiplier 204 provides a signal that is sufficient to cause the digital level translator 208 to produce an output signal. The variable bias supply 212 allows the triggering level for the digital level translator 208 to be adjusted to compensate for variations in the performance of other components in the detection/multiplication elements 108 and lot to lot or intra-chip variations in the switching threshold of the digital switch 220. Moreover, for a pulse data recorder 100 comprising a plurality of unit cells or pixels, the variable bias supply 212 can be individually adjusted for each unit cell or pixel. Accordingly, variations in the digital switching threshold from unit cell to unit cell can be equalized.

The readout circuit with shift registers 112 includes a digital switch 220 having an output state that is set by the output from the digital level translator 208. More particularly, the state of the switch 220 is reset or cleared upon the receipt of a pulse from a clock 228. In the interval between two clock pulses or cycles, the state of the switch 220 is set in response to receiving an output from the digital level translator 208, to indicate the detection of an event (e.g., the arrival of a photon). Once the state of the switch 220 has been set by the detection of at least one event that state is maintained until the next pulse of the clock 228 causes the switch 220 to be reset. While it is advantageous in some applications, such as for the recording events that are asynchronous with the system clock, to store the transient state of the switch until recorded and reset by a subsequent clock pulse, this is not a necessary condition. For example, if the duration of typical input pulses is longer than the clock period, then a latch is unnecessary and the input state can be directly recorded to memory. In the case where the pulse is shorter than a clock period, it may be acceptable to miss some pulses in order to minimize unit cell circuitry, for example. The state of the digital switch 220 is stored in a buffer memory or shift register 224, shown as a one bit wide, M-bit deep data buffer, at each pulse output by a clock 228. Accordingly, a record of whether an event has been detected in the interval between subsequent clock pulses is recorded. In accordance with embodiments of the present invention, the sequence of output states of the digital switch 220 may be stored as long as an enable signal 232 is received at the shift register 224.

The output circuit 116 may include a data formatter 236. The data formatter 236 may receive data from all of the unit cells 200 associated with the high speed pulse data recorder 100. An output 240 comprising formatted data from the data formatter may then be provided to another device, which may be external, for storage, analysis, further processing, and/or display. The formatted data may comprise, but is not limited to, the time history of the time of arrival of events, the time between events, or number of events per time period.

Figure 3:
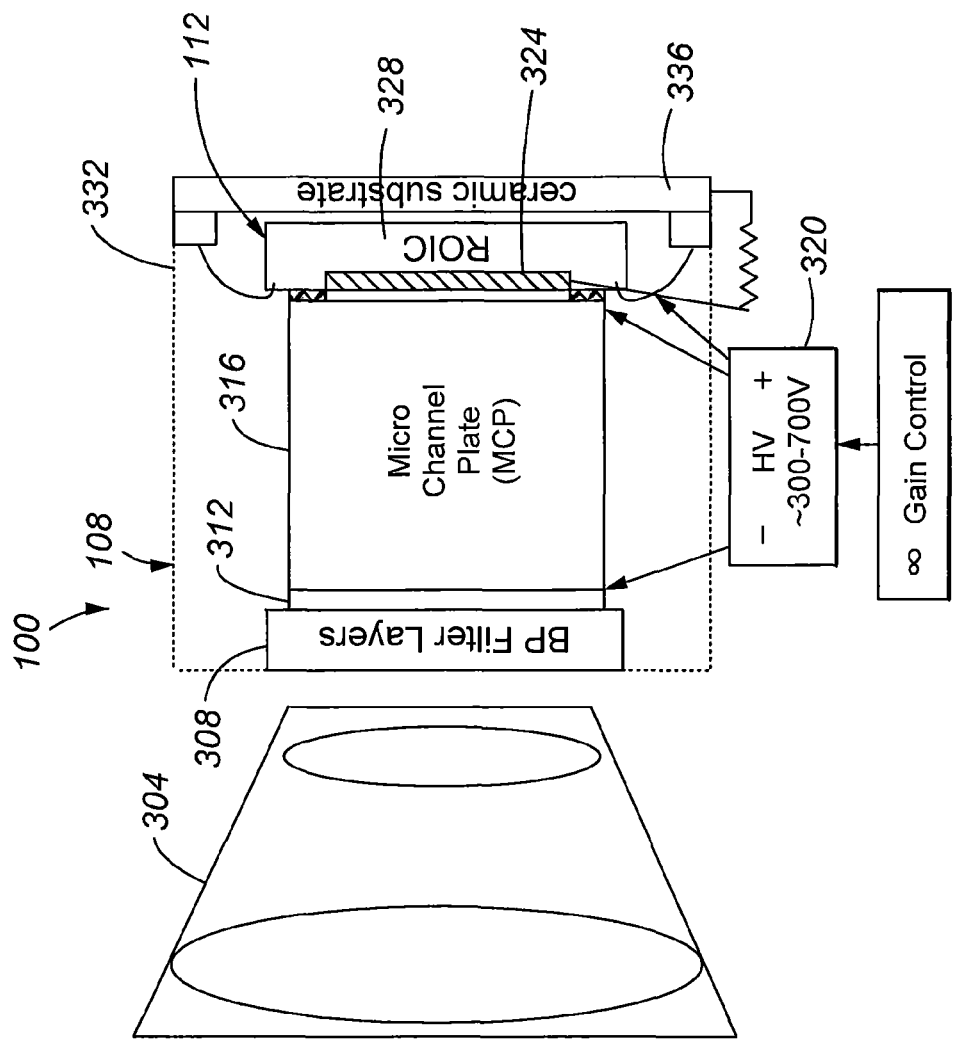
FIG. 3 depicts a pulse data recorder in association with photon detecting elements in accordance with embodiments of the present invention.

FIG. 3 depicts aspects of a pulse data recorder 100 in accordance with further embodiments of the present invention. More particularly, a pulse data recorder 100 suitable for use in connection with the detection of photons is depicted. Such a pulse data recorder 100 generally includes or is associated with an optical system 304 that is operative to direct received photons to the detection/multiplication elements 108 of the pulse data recorder 100. As illustrated, the photons collected by the optical system 304 may be passed through various filters, such as band pass filter layers 308, before impinging on a photocathode layer or plate 312. Additionally or alternatively, the photons collected by the optical system 304 can be subject to other processing before being passed to the photocathode layer 312. As can be appreciated by one of skill in the art, the arrival of photons at the photocathode layer 312 causes electrons to be emitted. An electron emitted by the photocathode layer 312 is accelerated towards a microchannel plate 316 by an electrical potential between the photocathode layer 312 and the microchannel plate 316 that is established by a voltage source 320. The accelerated electron then falls into a hole or pore of the microchannel plate, which causes a large number of additional electrons (e.g., $10^6$) to be emitted from the other end of the pore.

A pixel-patterned metallization or receiver layer 324 having a plurality of plates or pixels 404 (see FIG. 4) is provided on a side of the microchannel plate 316 opposite the photocathode layer 312. A voltage potential between the microchannel plate 316 and the pixels of the pixel patterned metallization layer 324 is established, for example by the voltage source 320, and the electrons emitted by the pore of the microchannel plate 316 are received at one of the pixels of the pixel patterned metallization layer 324. The arrival of the electrons at the pixel 404 of the pixel patterned metallization layer 324 produces a digital signal pulse that is provided to the readout circuit 112. As can be appreciated by one of skill in the art and after consideration of the present disclosure, the area of the photocathode layer 312 within which the photon is received is aligned with the pore of the microchannel plate 316 that receives the electron from the photocathode layer, and the pixel 404 of the pixel-patterned receiver layer 324 at which the electrons from the microchannel plate 316 are received is in turn aligned with the pore of the microchannel plate 316 that emitted the electrons. Accordingly, a pulse data recorder 100 in accordance with embodiments of the present invention can be used in imaging applications or other applications with more than one event receiver or unit cell. As depicted in FIG. 3, components of the detection/multiplication elements 108, such as digital level translators 208 and digital switches 220 can be combined with components of the readout circuit 112, in an integrated circuit 328 element.

As shown in FIG. 3, the detection/multiplication elements 108 and the readout circuit 112 may be encased within a vacuum envelope 332. Some or all components of the output circuit 116 may also be included within the vacuum envelope 332. The vacuum envelope 332 may be established in connection with a substrate 336, such as a ceramic substrate, to which components of the high speed pulse data recorder may be interconnected.

Figure 4:
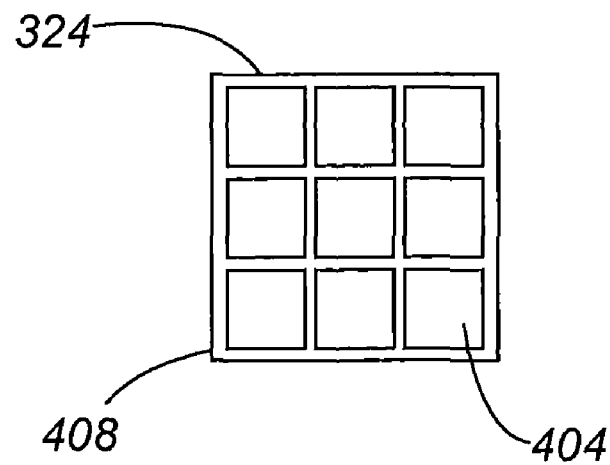
FIG. 4 depicts a pixel-patterned metallization layer in accordance with embodiments of the present invention in plan view.

FIG. 4 depicts a pixel patterned metallization layer 324 in accordance with embodiments of the present invention in plan view. As shown, the pixel patterned metallization layer 324 may include a number of plates or pixels 404 set on or in an insulator 408.

Figure 5:
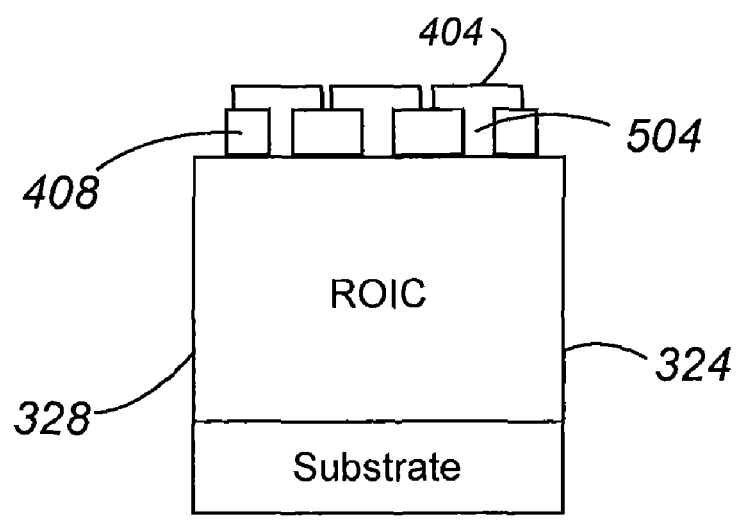
FIG. 5 depicts the pixel patterned metallization layer of FIG. 4 in cross section.

FIG. 5 depicts the pixel patterned metallization layer 324 of FIG. 4 in cross section. As shown, the individual pixels 404 may be interconnected to the readout integrated circuit 328 by leads or vias 504.

Figure 6:
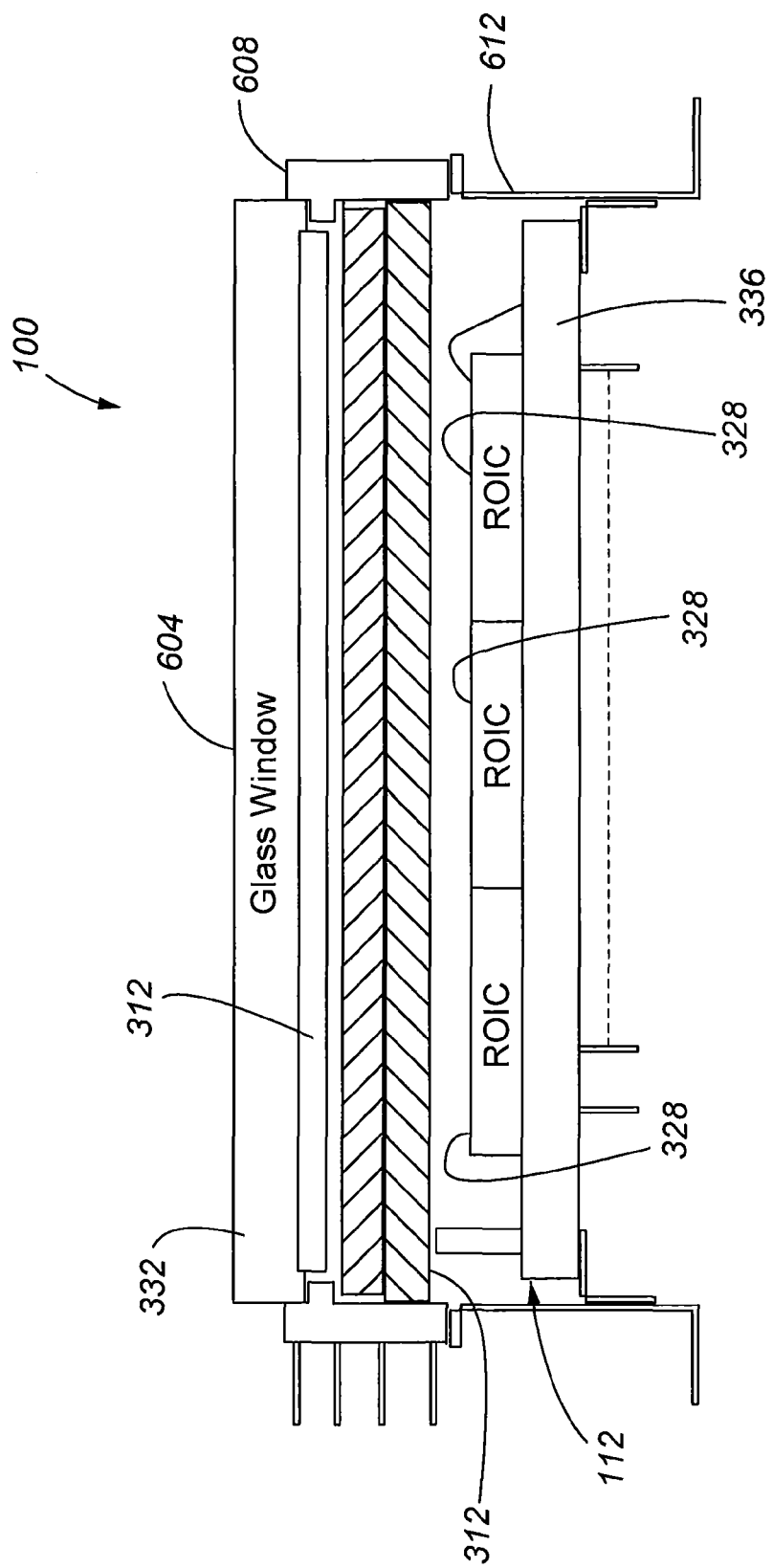
FIG. 6 is a cross section of an exemplary pulse data recorder in accordance with embodiments of the present invention configured to detect the arrival of photons.

FIG. 6 is a cross section of a pulse data recorder 100 for use in connection with the detection of photons in accordance with embodiments of the present invention. As shown, the pulse data recorder 100 can incorporate a plurality of microchannel plates 312, and a plurality of readout integrated circuits. In addition, the vacuum envelope 332 can be formed from a glass window 604, ceramic ring 608, metal ring 612, and ceramic substrate 336 to provide a unit that can be integrated into or with other components or systems.

Figure 7:
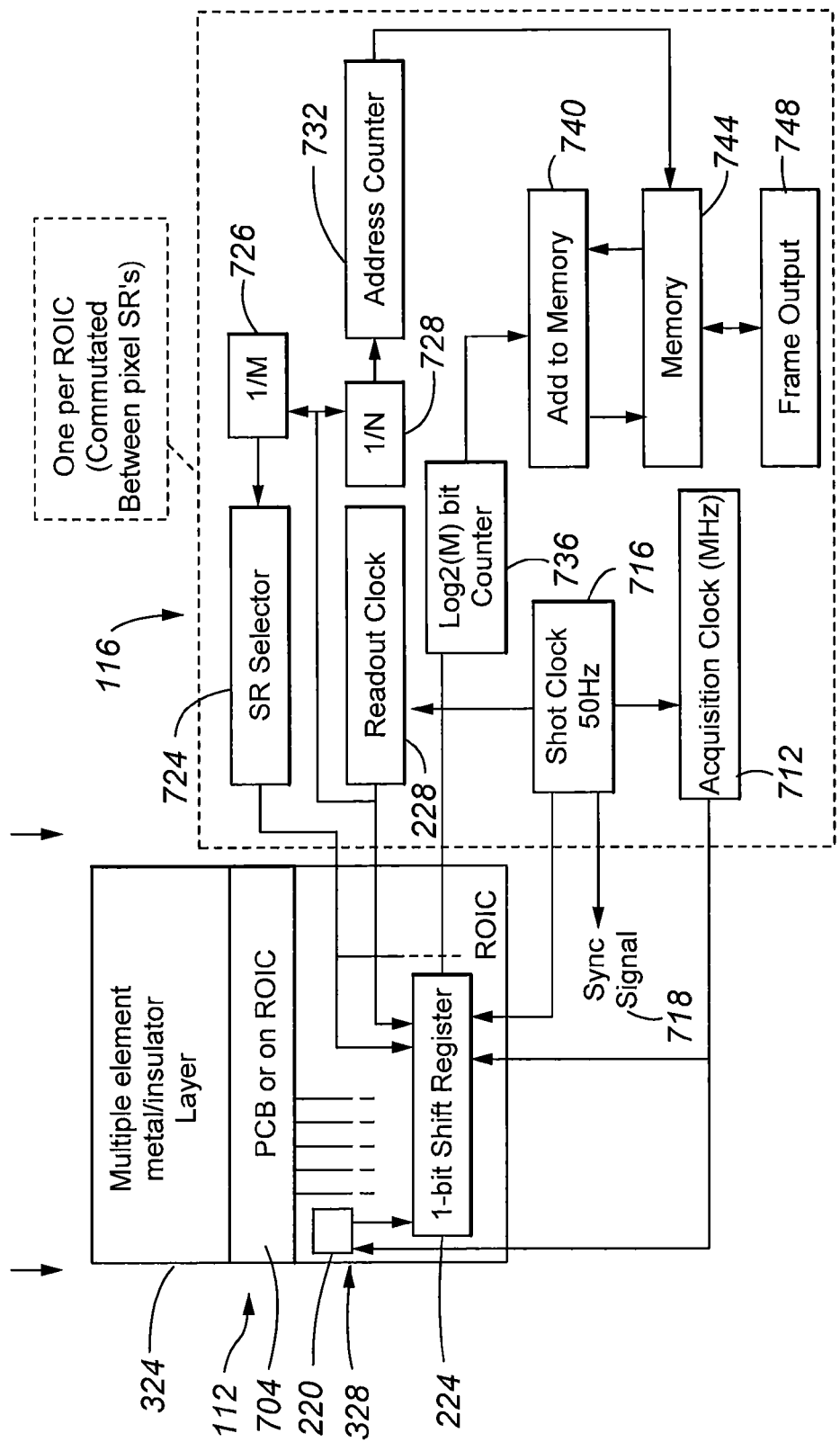
FIG. 7 depicts aspects of readout circuitry of a pulse data recorder in accordance with embodiments of the present invention.

FIG. 7 depicts aspects of readout circuitry 112 and output circuitry 116 of a pulse data recorder 100 in accordance with embodiments of the present invention. As shown, the readout circuit 112 can include a pixel patterned metallization layer 324 that is formed on or is part of a printed circuit board or a layer 704 of an integrated circuit 328 comprising the readout integrated circuit 112. Located behind (or opposite) and interconnected to each element of the pixel patterned metallization layer 324 is a digital switch or latch 220, and interconnected to each switch 220 is a buffer memory 224, such as a one bit wide shift register. The buffer memory 224 associated with each pixel can contain M-bits, and can be formed as part of the integrated circuit 328 comprising the readout circuit 112. Alternatively, the buffer memory 224 can be provided as a separate chip or component. By providing M-bits, each shift register 224 can accommodate M acquisition clock cycles per range gate. For clarity, only one switch 220 and only one buffer memory 224 is included in the figure. However, as noted, at least one switch 220 and at least one buffer memory 224 would be associated with each plate or pixel 404 of the pixel patterned metallization layer 324.

The output circuit 116 may be formed as part of the readout integrated circuit 328, or may be provided as a separate chip or component or set of chips or components. The readout circuit 116 generally includes an acquisition clock 712. The acquisition clock 712 is used to clock the input event states into the memory 224 (when enabled) and reset the latch 220, thus capturing the time history of events, such as the arrival of individual photons backscattered from the atmosphere, to determine the amount of time allowed to elapse between the generation of a propagating illumination pulse (for example as part of an active ladar) and the collection of data by the pulse data recorder 100. In illumination synchronous detection (e.g. lidar), a shot clock 716 provides an enable signal to various internal components of the systems 112 and 116, such as the acquisition clock 712 and the readout clock 228, and may also provide a synchronization signal 718 to external devices, for example, to trigger the generation of a laser illumination pulse. Alternatively, though not shown, the shot clock 716 can be arranged to trigger from an external source such as an instantaneous or delayed pulse from a laser pulse detector, to mark the start of an acquisition cycle. The output of the acquisition clock 712 is provided to the switch 220 and the buffer memory 224. The state of the switch 220, which is set or toggled by the presence of an electrical charge at an associated pixel 404 of the pixel patterned metallization layer 324 is stored at each pulse of the acquisition clock 712. In addition, the state of the switch 220 is reset for each new time interval. The acquisition clock 712 therefore determines the rate at which data within the buffer memory 224 is shifted, and the rate at which the state of the digital switch 220 is sampled and reset. As an example, the digital switch 220 is placed in a low state after being reset, such that the output of the digital switch is 0V. After an event has arrived, the state of the digital switch is set high, so that some non-zero voltage is present at the output of the switch. This non-zero voltage is maintained until the next pulse of the acquisition clock 712, which in this example causes the state of the switch 220 to return to the low state. This arrangement can facilitate power conservation when compared to typical discriminator implementations that employ traditional high bandwidth analog circuitry and comparators. Additionally, by gating the acquisition clock so it is operable only for a period sufficient to acquire the transient return signal, the level translation and input switching circuits can remain in a quiescent state for a substantial time between shot clock 716 acquisition initiations, allowing additional substantial power savings. However, as can be appreciated by one of skill in the art, other arrangements can be used to implement a digital signal at the output of the digital switch 220, and power conservation through gating various components.

Although the memory 224 is shown as a first in first out (FIFO) architecture triggered to store the input switch 220 state for M clock cycles on an enable by the shot clock 716, it can be appreciated by one skilled in the art that the memory 224 can also be arranged as a continuously running ring buffer, allowing recording of input pulse events both before and after shot clock enable signals. In this case, the shot clock acts to halt the acquisition of input events, and trigger the readout sequence to allow retrieval of the pre- and post-shot clock pulse record.

In order to read data out from the buffer memories 224 in embodiments featuring multiple pixels, a shift register selector 724 may be provided. During a read out sequence, the shift register selector 724 receives a signal from a 1/M divider 727 for every M-bits (where M is the depth of the pixel shift register) read from a buffer memory 224, in response to which the shift register selector 724 may select a next buffer memory 224 from which to read data. Accordingly, the shift register selector 724 can perform commutation and can allow binning functions. To implement binning (summing into select time segments), a 1/N divider 728 can be provided and the address counter 732 can provide a pointer to a unique location in the memory 744 (e.g. a RAM) corresponding to each of N time bins for each unit cell.

In this case, the bits of data read from the individual shift registers 224 are summed by a Log 2(M) bit counter 736 and passed through an add to memory block 740 that replaces the selected memory 744 contents with the sum of the current memory 744 cell contents and the counter 736 count. In general, the Log 2(M) bit counter 736 is provided as part of a binning function, in which collected data is summed by being placed into range bins containing M sequential bits of data from shift register 224. One or a select number of frames may be acquired and summed in this fashion in the same memory 744 before data output to reduce transferred data volume. However, as can be appreciated by one of skill in the art after consideration of the present description, the provision of such a counter and the application of range binning is not required. The add to memory 740 function may be included to facilitate the acquisition and summing of binned data before readout, to facilitate very high frame rates, for example as is desirable to support ladar applications with a laser transmitter that is pulsed at kHz to MHz rates. The frame output 748 provides an external interface to access the collected data.

Figure 8:
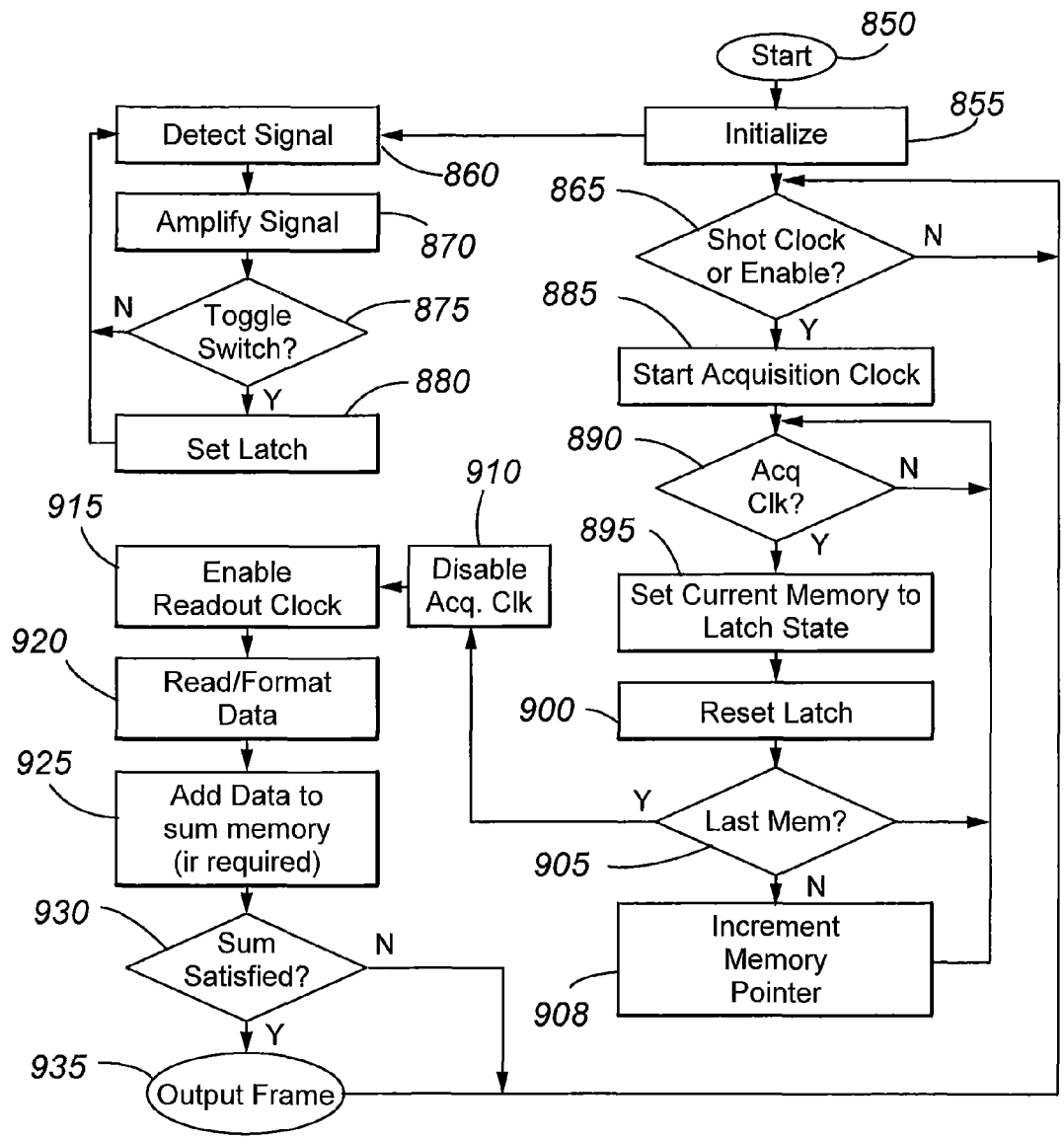
FIG. 8 is a flow chart depicting a method for recording events in accordance with embodiments of the present invention.

FIG. 8 shows a flow chart of the typical operation of the data recorder system 100 in a high frame rate flash lidar operation. The flow starts at 850 where the system is started in response for example to applied power or a reset operation, and proceeds to 855 where initialization of the components is accomplished. This may include setting all memory and logic to known states, entering programmable values indicating for example, the desired memory 224 bit depth behind pixels 404, the switching threshold voltages for each unit cell, the number of frames to sum in the summing buffer memory 744 before outputting a frame, the range gate depth, the frame rate clock rate or frame trigger source (e.g. internal or external shot clock 716), and any address pointers. Initialization starts two separate processes, a detection process beginning at 860 when an event is detected, e.g. a photon dislodges an electron from a photocathode, and an acquisition process that begins in a conditional wait loop 865 that monitors the shot clock 716 or external enable for a signal indicating the start of acquisition. This allows precise synchronization of the data recorder system with an external source, for example, the emission of an optical pulse from an illumination laser.

Once an event is detected at 860 producing an event signal, the event signal is conditioned in step 870, for example by being subjected to amplification or level translation in the aforementioned manners so that it is capable of triggering the aforementioned latch 220. Where the received event signal comprises a photon or photons, detection and amplification can include receiving the photon or photons at a photosensitive electron source, such as a photocathode, radiation target or illuminated semiconductor layer, and multiplication at an electron multiplier 204, such as a microchannel plate or a semiconductor or rarified gas electrical discharge channel Geiger mode device. As further examples, the detection of the received signal can include the generation of an electrical signal using a piezo-electric device or a mechanical switch to detect movement or the application of a force. As a further example, an event comprising an electrical signal can be amplified. The detected and/or amplified signal is used to set the state of a switch 220 associated with the plate or pixel 404 which the signal was received. If the switch is set at 875, flow in this process sets the latch at 880, and subsequent flow returns to detect a next signal at 860. Meanwhile, the latch remains set awaiting a read and reset operation by the acquisition process.

Once an enable signal is received at 865, flow proceeds to 885 where the acquisition clock is started or enabled, and flow proceeds to acquisition loop 890 that monitors the state of the acquisition clock 712. When a clock pulse is detected, flow proceeds to 895 where the current state of the latch 220 is transferred to the currently selected location in the memory 224. If memory 224 is a shift register, this location is always the first stage of the shift register; if it is a RAM type memory, this is the location currently selected by its associated address pointer. Once the state of the latch 220 is faithfully recorded in memory 224, flow proceeds to 900 where the latch 220 is reset so that it can record another detection event. If detection of an event since the last reset of the latch 220 is indicated, for instance, by a "1" at the output of the latch 220, and no detected event indicated by a "0" at the output of latch 220, then a reset operation is defined as returning the output of the latch to "0" and placing the latch in a state where it can be set to a "1" by a subsequent detection at 860 as previously outlined. Once the latch is reset at 900, flow proceeds to 905 where the current selected location of the memory 224 is compared to the maximum number of locations available or the selected memory depth, which ever is less.

If the last memory location filled is less than the maximum selected memory depth, then flow proceeds to 908 where the memory 224 current location is incremented. In a shift register, this increment is automatically implemented when a clock signal advances each register. If the memory 224 is a RAM, the address pointer to the RAM is incremented to address the next location. Flow then returns to 890 with subsequent operation as previously outlined.

If at 905 the maximum desired memory depth is reached, flow proceeds to 910 where the acquisition clock 712 is disabled, and proceeding to 915, the readout clock 228 is enabled permitting readout and formatting of the data at 920 from the memory 224. Said formatting may include binning, counting of clock cycles between recorded event pulses, integration, or other data formatting or compression schemes. Data read at 920 may next be added to the contents of select aforementioned memory 744 cells to facilitate summing of multiple frames, if needed, for instance, to reduce output data rates. Summing frames is useful where the event rate per frame is very low and the signal giving rise to the events is stationary over several frames, or where the acquisition frame rate is very high but the number of events is small per frame, e.g. in a flash lidar where a high pulse rate, low pulse energy laser is used for illumination.

After summing the current frame data in memory 774, flow proceeds to 930 where the number of frames summed is compared to the desired number of summed frames. If at 930 the desired number exceeds the number of summed frames, flow returns to 865 and the system 100 acquisition waits for the next shot clock 716 pulse or enable signal, with subsequent operation as previously outlined. If at 930 the desired number of summed frames is satisfied, flow proceeds to 935 where the sum buffer is output from the system 100 to an external device, e.g. a data recording system, transmitter, or display. If further formatting or compression of the data is needed, this can be accomplished as part of the data output process. As one skilled in the art can appreciate, operation of the system 100 in accordance with the outlined flow continues in an endless loop. This is a desirable state for an image acquisition system. Removing operational power from the whole or select subsystems, halting at 935 until a frame has been externally read, or otherwise withdrawing enable, or providing additional disable, signals can be implemented as means well known in the art for reducing operational power and tailoring performance to specific applications. As an example within the current state of the art for standard 65 nm silicon CMOS technology, a 14 mm×14 mm chip with 256× 256 pixels, having a buffer memory 224 within each pixel of a pulse data recorder 100 for use in connection with an imaging lidar could contain about 6000 bits in order to record events at range intervals of 1.5 cm (100 ps clock period) over a range of 90 m. Be it noted that the time series acquisition may be delayed to commence at any select range after the laser pulse is transmitted. Alternatively, for a range resolution of 1.5 m (1 ns clock period) a 9 km depth of range can be accommodated. Moreover, it can be appreciated that a time history of electron pulse arrivals at the unit cell associated with the pixel or plate 404 at which events are received is stored in the buffer memory 224.

Although various embodiments of a pulse data recorder 100 have been described, it should be appreciated that variations may be implemented, without departing from the basic features of the pulse data recorder 100 disclosed herein. For example, although suitable for use as a high speed pulse data recorder providing range and intensity information as part of a ladar, including an imaging ladar, embodiments of the present invention are not limited to such applications. In particular, the basic features of the disclosed pulse data recorder 100, including a plate or pixel 404 for receiving electrons generated in response to the occurrence of an event, the setting or toggling of a digital switch 220 in response to the receipt of electrons at the plate or pixel 404, and the sampling of the state of the digital switch 220 at intervals corresponding to the pulse or signal from a readout clock 228 can be used to obtain a time record of any sequence of events.

As will be apparent to one of skill in the art after consideration of the present disclosure, a pulse data recorder 100 in accordance with embodiments of the present invention provides a record of a time at which pulse type events are detected. Moreover, the digital nature of the occurrence of a pulse type event is maintained at all stages of the disclosed pulse data recorder 100. Accordingly, very precise intensity and time of arrival information can be obtained, particularly where the pulse data recorder 100 is operated at high clock rates. In addition, because of the all digital design, a comparatively high speed, low power and dense pulse data recorder is provided. Moreover, the pipelined single bit architecture of unit cells of the pulse data recorder 100 disconnects the timing and recording of event arrivals between pixels and within the components of each unit cell, eliminating the complex multi bit synchronization issues that limit acquisition speed in other approaches. In addition, very high frame rates are enabled, making embodiments of the pulse data recorder capable of use as part of high spatial resolution imagers, including push broom imagers.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for counting events, comprising:
   detecting a first event;
   in response to detecting the first event, setting a state of a first switch;
   at a first time, storing the state of the first switch at the first time in a first cell of a first memory;
   resetting the state of the first switch; and
   at a second time, moving the stored state of the first switch at the first time to a second cell of the first memory, and storing the state of the first switch at the second time in the first cell of the first memory, wherein the second time occurs after the first time and after resetting the state of the first switch.

2. The method of claim 1, wherein the first time corresponds to a first clock pulse, and wherein the second time corresponds to a second clock pulse.

3. The method of claim 2, wherein the first memory comprises a 1×M bit shift register.

4. The method of claim 3, further comprising:
   detecting a second event, wherein the second event is received after the first clock pulse and before the second clock pulse, and wherein the second event is received after the state of the first switch has been reset;
   in response to detecting the second event and prior to the second clock pulse, setting the state of the first switch; and
   in response to the second clock pulse, clocking the memory, wherein the state of the first switch at the first time is stored in a second cell of the memory, and wherein the state of the first switch at the second time is stored in the first cell of the memory.

5. The method of claim 4, wherein the first switch is a latch, wherein in the absence of detecting an event after a clock pulse the latch is in a first state, wherein said detecting said first event sets the latch to a second state, and wherein resetting sets the latch to the first state.

6. The method of claim 4, wherein the first event is the arrival of a first photon at a detector, wherein the second event is the arrival of a second photon at the detector, and wherein an elapsed time between said first clock pulse and said second clock pulse provides an intensity of a signal comprising the first and second events.

7. The method of claim 1, wherein the first event is the arrival of a photon at a detector, wherein detecting the first event includes:
   receiving at least a first photon at a first element; and
   in response to receiving at least a first photon at a first element, generating a plurality of electrons, wherein the state of the first switch is set by the plurality of electrons.

8. The method of claim 1, further comprising:
   detecting a second event, wherein the first event is detected in association with a first area of a detector and the second event is detected in association with a second area of the detector;
   in response to detecting the second event, setting a state of a second switch;
   at the first time, storing the state of the second switch in a first cell of a second memory;
   resetting the state of the second switch; and
   at the second time, moving the stored state of the second switch at the first time to a second cell of the second memory, and storing the state of the second switch at the second time in the first cell of the second memory, wherein the first memory is a first 1×M bit memory, and wherein the second memory is a second 1×M bit memory.

9. The method of claim 8, wherein the first area of the detector, the first switch, and the first memory comprise a first unit cell of an imaging photon-counting lidar, and wherein the second area of the detector, the second switch, and the second memory comprise a second unit cell of the imaging photon-counting lidar.

10. The method of claim 3, further comprising:
   reading out M bits of data from said 1×M bit shift register.

* * * * *